Patented Sept. 6, 1938

2,129,584

UNITED STATES PATENT OFFICE 2,129,584

RECOVERY OF HORMONES

Holger Laurits Peter Kjems, Copenhagen, Denmark, assignor to August Julius Helmuth Kongsted, Copenhagen, Denmark No Drawing. Application March 19, 1937, Serial No. 131,937. In Great Britain May 5, 1936

8 Claims. (Cl. 167—74)

The present invention relates to processes for recovering hormones, especially the pituitary and sexual hormones, from natural raw materials in which the hormone or hormones to be recovered is or are present together with other organic substances. The term "natural raw materials" is used to denote materials which occur naturally in animal organisms and excludes mixtures containing the substances in question, when these are artificially produced, for example, by synthesis. Examples of such natural raw materials which may be treated by the process constituting the present invention include urine, serum and extracts from various organs, especially from glands having internal secretion, for instance the pituitary body or its anterior or posterior lobes, ovaries, corpora lutea or ovaries from which the corpora lutea have been removed, placentae or testicles. The process is especially suitable in the treatment of aqueous liquids. These, prior to the step in the recovery of the hormone which forms the subject matter of the present invention, may be subjected to any known treatment for obtaining a solution of the hormone or hormones in question, such treatment having for its object the removal of foreign substances from the solution or the production of a solution the concentration of which with respect to the hormones in question is increased.

The present invention is based on the observation that insoluble products having an adsorbing nature formed by precipitation from aqueous solutions of ferrocyanides or ferricyanides possess properties rendering them particularly suitable for use in adsorbing hormones.

Adsorption is known per se as a step in the extraction of a hormone from a material containing it, the hormone being adsorbed by a suitable adsorbing agent from which it is extracted by washing with a liquid which dissolves the hormone in question. It has been proposed to use for this purpose preformed adsorbing powders such as vegetable or animal charcoal, silica gel or infusorial earth. The use of precipitates having adsorptive power formed from their components in situ in the liquid and which will more or less completely carry with them the hormone, has also been proposed. An example of such an adsorbing precipitate which may be formed in situ in the liquid is aluminum hydroxide. The present invention constitutes an improvement in this process.

According to the present invention, a solution of a ferrocyanide or a ferricyanide and a solution of a metal salt with which the ferrocyanide or ferricyanide forms an adsorbing precipitate are added to a solution containing the hormone or hormones to be recovered together with other substances. The precipitate thus obtained differs from known adsorptive agents in combining to a high degree the capacity for adsorbing hormones and the capacity for yielding them up in a relatively pure state during subsequent extraction with a suitable solvent.

Generally it is preferable to use the ferrocyanide and ferricyanide of an alkali metal including ammonia, but other soluble ferrocyanides or ferricyanides, for instance the aluminium, calcium, barium, strontium or magnesium salts may also be employed. Examples of metal salts which form adsorbing precipitates with the above substances are cupric salts or zinc salts in the case of the ferricyanides and cobaltous, manganous or zinc salts in the case of the ferrocyanides. The composition of the insoluble compounds formed is somewhat variable, and normally they will contain some of the metal, for instance the alkali metal, present in the soluble ferrocyanide, or ferricyanide in addition to the metal of the salt employed to produce the precipitation and to the ferrocyanide or ferricyanide group. Not all the insoluble compounds thus produced have the property of adsorbing hormones, and the suitability of any particular compound for the process of the present invention may readily be determined by means of a simple test with methylene blue. This test is based on the fact that the adsorptive power of the compounds for hormones is always much greater than it is for methylene blue and consists in adding 5 cc. of a molar solution of a soluble ferrocyanide or ferricyanide and 5 cc. of a molar solution of a metallic salt forming a precipitate therewith to 30 cc. of a 0.1% aqueous solution of methylene blue. When a substantial decolouration is obtained the ferrocyanide or ferricyanide precipitate formed is regarded as a suitable hormone adsorbent for use in the present process.

The power of absorbing hormones possessed by these insoluble ferrocyanide or ferricyanide precipitates may be utilized to the best effect at pH-values between 3 and 7, preferably at a pH-value of about 5, and consequently it is preferred and constitutes a further feature of the present invention, to adjust the pH-value of the liquid from which it is desired to adsorb the hormones to a point within these limits prior to the formation of the precipitate.

The process of the present invention is preferably carried out by adding, after the pH-value of the hormone-containing liquid has been suitably adjusted, a solution of one or other of the metallic salts adapted to precipitate either ferrocyanides or ferricyanides and then, with violent agitation, adding a solution of either a ferrocyanide or a ferricyanide. The metallic salt and the ferrocyanide or ferricyanide are preferably employed in chemically equivalent quantities. The order in which they are added to the solution may be inverted. The quantities and concentrations of the reagents added to the solution may vary within wide limits but preferably the concentration is that in which the reagent is normally found in the laboratory, such as 5% or 1N or 2N, and preferably the molar concentrations of the components are the same or bear a simple ratio one to the other. An excess which is not too great of one or the other of the reagents will not produce a recognizable alteration in the result. After standing for some time the precipitate is separated from the remaining solution and treated with one or more solvents adapted to extract the hormone or hormones adsorbed on the precipitate.

An especially suitable absorbing precipitate for use in the present process is potassium zinc ferrocyanide. The invention therefore will now be specifically described by reference to a number of examples in which this adsorbent is used.

Example 1

Urine from pregnant women is filtered. 10 litres of the filtrate are adjusted with acetic acid to pH=5 after which 75 cc. 2N solution of zinc sulphate are added. After this 75 cc. 2N solution of potassium ferrocyanide are added with violent agitation and the mixture is left to stand for 24 hours. The liquid is decanted from the precipitate, from which the greater part of the remaining liquid is removed by centrifuging. The precipitate is then washed thoroughly with acetone, a solution of oestrin being thereby produced. The precipitate is then suspended in 200 cc. of 1% solution of ammonia. After separation the precipitate is washed with a further quantity of a 1% solution of ammonia, to which may be added a strong electrolite, for example 5 cc. of a saturated solution of sodium chloride per 100 cc. of ammonia solution, immediately before it is centrifuged. This facilitates the separation of the precipitate from the solution. The ammoniacal extracts contain the total amount of gonadotropic hormone present in the urine and this hormone is substantially free of impurities.

Example 2

100 litres urine from pregnant mares is adjusted with concentrated sulphuric acid to pH=5. 1000 cc. of 2N solution of zinc sulphate are added to the mixture and then 1000 cc. of 2N solution of potassium ferrocyanide are added with violent agitation. After standing for 24 hours, the liquid is separated from the precipitate by decantation and the precipitate is separated from the remaining part of the liquid by centrifuging. The precipitate is then extracted several times with acetone or alcohol the extracting agents used being removed by decanting or centrifuging before each subsequent addition of another quantity of extraction agent.

The extracts which may amount for instance to 10 litres contain the oestrin which was present in the urine.

Example 3

Serum from pregnant mares is deprived of proteins by a protein-precipitating agent such as picric acid that does not precipitate the hormones. The filtrate is adjusted to pH=5 and to each 10 litres of the filtrate 150 cc. of 2N zinc-sulphate are first added and the 150 cc. of 2N potassium ferrocyanide are slowly added with violent agitation. After standing for 24 hours at 0° C., the liquid is subjected to decantation and the precipitate is separated from the remaining liquid by centrifuging and is treated as described in Example 1. When 1 litre of ammonia is used for the extraction, the extracts will contain practically all the gonadotropic hormone which was present in the serum.

Example 4

The solution obtained by extracting 1 kg. anterior lobes of pituitary bodies with a solution of sodium bicarbonate at pH=9.25 is adjusted to pH=7.2 whereby a precipitate forms which is separated by filtration. Acetic acid is added to the filtrate to adjust it to pH=5.5 so as to cause further precipitation after which the liquid is decanted and the precipitate is centrifuged. 600 cc. of 2N solution of zinc sulphate are then added to the liquid thus adjusted to pH=5.5 and the precipitates formed are removed. After this, 600 cc. of 2N solution of potassium ferrocyanide are added while agitating. After 24 hours at 0° C., the liquid is decanted and the precipitate is then subjected to centrifugal action. The precipitate is then subjected to elution with several parts of 1% ammonia the liquid being removed by centrifuging before each addition of another portion. The extracts contain the hormones of the anterior lobe of the pituitary body which are soluble in weak alkali except the mammar-stimulating hormone which is present in the precipitate mentioned above and produced in the adjustment of the raw material to pH=5.5.

The potassium zinc ferrocyanide used as the adsorbing precipitate in the above example may be replaced by other insoluble ferrocyanides or ferricyanides, the criterion of their utility being their capacity to discolour a solution of methylene blue by the test described above. The process in such cases is identical with that illustrated above in the case of potassium zinc ferrocyanide.

I claim:

1. A process for the recovery of pituitary and sexual hormones from natural raw materials containing them, comprising adding to a hormone-containing aqueous liquid having a pH-value of from 3 to 7 a substance of the group consisting of soluble ferrocyanides and ferricyanides, and a metal salt forming therewith an insoluble precipitate containing the corresponding ferrocyanide or ferricyanide radical and having adsorbing properties, and thereafter treating the precipitate with solvent means for the hormones to be recovered.

2. A process for the recovery of pituitary and sexual hormones from natural raw materials containing them, comprising adding to a hormone-containing aqueous liquid having a pH-value of from 3 to 7 a soluble ferrocyanide and a metal salt forming therewith an insoluble precipitate containing the ferrocyanide radical and having adsorbing properties, and thereafter treating the precipitate with solvent means for the hormones to be recovered.

3. A process for the recovery of pituitary and sexual hormones from natural raw materials containing them, comprising adding to a hormone-containing aqueous liquid having a pH-value of from 3 to 7 a soluble ferricyanide and a metal salt forming therewith an insoluble precipitate containing the ferricyanide radical and having adsorbing properties, and thereafter treating the precipitate with solvent means for the hormones to be recovered.

4. A process for the recovery of pituitary and sexual hormones from natural raw materials containing them, comprising adding to a hormone-containing aqueous liquid having a pH-value of from 3 to 7 potassium ferrocyanide and a soluble zinc salt forming therewith an insoluble precipitate having adsorbing properties, and thereafter treating the precipitate with solvent means for the hormones to be recovered.

5. A process for the recovery of pituitary and sexual hormones from natural raw materials containing them, comprising adjusting the pH of a hormone-containing aqueous liquid to a value between 3 and 7, adding to the liquid a substance of the group consisting of soluble ferrocyanides and ferricyanides, and a metal salt forming therewith an insoluble precipitate containing the corresponding ferrocyanide or ferricyanide radical and having adsorbing properties, and thereafter treating the precipitate with solvent means for the hormones to be recovered.

6. A process for the recovery of pituitary and sexual hormones from natural raw materials containing them comprising adjusting the pH of a hormone-containing aqueous liquid to a value between 3 and 7, adding to the liquid a soluble ferrocyanide and a metal salt forming therewith an insoluble precipitate containing the ferrocyanide radical and having adsorbing properties, and thereafter treating the precipitate with solvent means for the hormones to be recovered.

7. A process for the recovery of pituitary and sexual hormones from natural raw materials containing them, comprising adjusting the pH of a hormone-containing aqueous liquid to a value between 3 and 7, adding to the liquid a soluble ferricyanide and a metal salt forming therewith an insoluble precipitate containing the ferricyanide radical and having adsorbing properties, and thereafter treating the precipitate with solvent means for the hormones to be recovered.

8. A process for the recovery of pituitary and sexual hormones from natural raw materials containing them, comprising adjusting the pH of a hormone-containing aqueous liquid to a value between 3 and 7, adding potassium ferrocyanide and a soluble zinc salt forming therewith an insoluble precipitate, and thereafter treating the precipitate with solvent means for the hormones to be recovered.

HOLGER LAURITS PETER KJEMS.